US010228482B2

(12) United States Patent
Smiarowski et al.

(10) Patent No.: US 10,228,482 B2
(45) Date of Patent: Mar. 12, 2019

(54) SYSTEMS AND METHODS FOR MULTIPLE BANDWIDTH ELECTROMAGNETIC GEOPHYSICAL EXPLORATION (71) Applicant: CGG SERVICES SA, Massy (FR)

(72) Inventors: Adam Smiarowski, Toronto (CA); Jason Berringer, Rockwood (CA); Philip Miles, Rockwood (CA)

(73) Assignee: CGG SERVICES SAS, Massy (FR)

(*) Notice: Subject to any disclaimer, the term of this patent is extended or adjusted under 35 U.S.C. 154(b) by 0 days.

(21) Appl. No.: 15/305,769

(22) PCT Filed: Apr. 21, 2015

(86) PCT No.: PCT/IB2015/000797
§ 371 (c)(1),
(2) Date: Oct. 21, 2016

(87) PCT Pub. No.: WO2015/162493
PCT Pub. Date: Oct. 29, 2015

(65) Prior Publication Data
US 2017/0045638 A1 Feb. 16, 2017

Related U.S. Application Data (60) Provisional application No. 61/983,299, filed on Apr. 23, 2014.

(51) Int. Cl.
G01V 3/16 (2006.01)
G01V 3/17 (2006.01)

(52) U.S. Cl.
CPC . *G01V 3/16* (2013.01); *G01V 3/17* (2013.01)

(58) Field of Classification Search
CPC .................... G01V 3/16; G01V 3/17
(Continued)

(56) References Cited

U.S. PATENT DOCUMENTS 2,652,530 A 9/1953 Davidson
3,936,728 A 2/1976 Ghosh et al.
(Continued)

FOREIGN PATENT DOCUMENTS

CA 1131705 A 9/1982
JP 0470588 A 3/1992
(Continued)

OTHER PUBLICATIONS

International Search Report in related International Application No. PCT/IB2015/000797, dated Dec. 4, 2015.
(Continued)

*Primary Examiner* — Jay Patidar
(74) *Attorney, Agent, or Firm* — Patent Portfolio Builders PLLC (57) ABSTRACT An electromagnetic geophysical exploration system includes a first transmitter configured to transmit a first waveform in a first spectrum, a first receiver configured to sense signals in the first spectrum, a second transmitter configured to transmit a second waveform in a second spectrum, the second spectrum having a frequency higher than a frequency of the first spectrum, a second receiver configured to sense signals in the second spectrum, the second receiver configured to be minimum-coupled to the second transmitter, wherein a transmitter coil of the second transmitter is disposed between an inner receiver coil and an outer receiver coil of the second receiver, and the inner receiver coil and the outer receiver coil of the second receiver surround the transmitter coil of the second transmitter, and a control portion configured to control the first transmitter and the second transmitter.

20 Claims, 7 Drawing Sheets (58) Field of Classification Search
USPC ......................................................... 324/330
See application file for complete search history.

(56) References Cited

U.S. PATENT DOCUMENTS

2004/0051619 A1    3/2004  Bryan
2012/0293177 A1*  11/2012  Dodds .................. G01V 3/17
                                                              324/331

FOREIGN PATENT DOCUMENTS

WO        2004/072684 A1     8/2004
WO        2012/175088 A1    12/2012
WO        2014/056094 A1     4/2014

OTHER PUBLICATIONS

Written Opinion of the International Searching Authority in related International Application No. PCT/IB2015/000797, dated Dec. 4, 2015.
Third Party Observation, date of submission Aug. 23, 2016.
M. Allard, "On the Origin of the HTEM Species", Advances in Airborne, Geophysics, Proceedings of Exploration 07: Fifth Decennial International Conference on Mineral Exploration, 2007, pp. 355-374.
Fugro Airborne Surveys, "Resolve Survey for North Platte Natural Resources District NP, SP, and Crescent Lake Areas, Scottsbluff, Western Nebraska", Jul. 22, 2009, Figro Airborne Surveys, Corp., Report # 09014.
G. Hodges et al., "Geobandwidth: Comparing EM Waveforms with a Wire-loop Model", 13th SAGA Biennial Conference and Exhibition, Oct. 6, 2013.
G. Liu, "Effect of Transmitter Current Waveform on Airborne TEM Response", Exploration Geophysics, 1998, vol. 29, pp. 35-41.
N.S. Nyboe et al., "Noise Reduction in TEM: Presenting a Bandwidth- and Sensitivity-optimized Parallel Recording Setup and Methods for Adaptive Synchronous Detection", Geophysics, vol. 77, No. 3, May-Jun. 2012, pp. E203-E212.
R.S. Smith et al., "Appendix One—Principles of Electromagnetic Methods in Surface Geophysics", "Airborne Electromagnetic Prospecting Systems", 2014, Elsevier.
Communication pursuant to Article 94(3) EPC in corresponding European Application No. 15 747 527.8 dated Oct. 23, 2017. (All references not cited herewith have been previously made of record.).
N. Skovgaard, et al.; "Noise reduction in TEM: Presenting a bandwidth-and-sensitivity-optimized parallel recording setup and methods for adaptive synchronous detection"; XP-001575497; Geophysics, Society of Exploration of Geophysicists, US; vol. 77; No. 3, May 1, 2012; pp. E203-E212.
J. Torquil Smith et al., "Multi-transmitter multi-receiver null coupled systems for inductive detection and aharacterization of metallic objects", Journal of Applied Geophysics, 2007, pp. 227-234, vol. 61.

* cited by examiner

SYSTEMS AND METHODS FOR MULTIPLE BANDWIDTH ELECTROMAGNETIC GEOPHYSICAL EXPLORATION

CROSS-REFERENCE TO RELATED APPLICATION

This application claims the benefit under 35 U.S.C. § 119(e) of U.S. Provisional Application Ser. No. 61/983,299 filed on Apr. 23, 2014, which is incorporated by reference in its entirety for all purposes.

TECHNICAL FIELD

The present disclosure relates generally to geophysical electromagnetic exploration and, more particularly, to systems and methods for measuring electromagnetic responses for geophysical exploration over an extremely wide band of frequencies.

BACKGROUND

Electromagnetic (EM) geophysical exploration methods measure the response of subsurface formations to the propagation of naturally or artificially generated electromagnetic fields. Primary electromagnetic fields may be generated by passing alternating current or pulsing a current through a "transmitter coil" which is an electrically conducting wire or tube which may have an air core or be wrapped around a core made of some electrical conductor. Use of an alternating current is referred to as frequency domain EM while the use of a pulsed current where the current is applied during an on-period and switched off during an off-period is referred to as time-domain EM or transient EM. In both cases, the time-variation of current passing through the transmitter coil produces a response in a large vicinity around the transmitter coil. A transmitter coil may be a small coil made up of many turns of wire or a large loop of wire with multiple turns. Subsurface formations respond to the propagation of time-varying primary electromagnetic fields with the generation of secondary electrical currents by the process of electromagnetic induction (which is the production of a voltage across a conductor when it is exposed to a varying magnetic field) giving rise to secondary electromagnetic fields. The primary and secondary electromagnetic fields may be detected by a "receiver." A receiver may measure the time-variation of the magnetic field from these currents (for example a coil receiver measuring dB/dt) or may measure the magnetic field itself (a B-field sensor). Hereinafter, the terms "transmitter coil" and "transmitter" may be used interchangeably and the terms "receiver coil" and "receiver" may be used interchangeably.

The primary electromagnetic field travels from the transmitter coil to the receiver coil via paths both above and below the surface of the earth. In the presence of a conducting body or earth material such as soils, rocks, ores or other conducting material, the magnetic component of the electromagnetic field penetrating the subsurface induces time-varying currents, or eddy currents, to flow in the conducting body. The eddy currents generate their own electromagnetic field (referred to as secondary EM field) that travels to the receiver. The receiver then undergoes a response to the resultant of the arriving primary and secondary electromagnetic fields so that the response differs in both phase and amplitude from the response to the primary electromagnetic field alone. Differences between the transmitted and received electromagnetic fields reveal the presence of the conducting body or conducting material and provide information on the conducting body's geometry and electrical properties.

Because electromagnetic fields propagate through air, there is no need for physical contact of either the transmitter coil or receiver coil with the earth's surface. EM surveys can thus proceed much more rapidly than galvanic method surveys, where ground contact is required. More importantly, one or both of transmitter coil and receiver coil can be mounted in or on or towed behind aircraft. Airborne EM methods are used in prospecting for conductive ore bodies and many other geological targets due to their speed and relative cost-effectiveness.

The electromagnetic response from subsurface materials or bodies is dependent on the electrical conductivity of the material or body. Conductive bodies and other structures such as layers with low electrical conductivity exhibit different electromagnetic responses.

Thus, in summary, EM surveying or other geophysical exploration uses the principle of electromagnetic induction to measure the electrical conductivity of the subsurface. In the case of a frequency-domain EM survey, an alternating electric current of known frequency and magnitude is passed through a transmitter coil creating a primary EM field in the space surrounding the coil, including underground. The time-varying EM fields induce a secondary current in underground conductors or structures which results in an alternating secondary magnetic field that is sensed by the receiving coil. The secondary field is distinguished from the primary field by a phase lag. The ratio of the magnitudes of the primary and secondary currents is proportional to the terrain conductivity. The depth of penetration of the EM field into the subsurface is governed by the subsurface electrical conductivity and transmitter excitation frequency and coil separation and orientation.

In the case of a transient EM survey, the same principle of electromagnetic induction is used to measure the electrical conductivity of the subsurface. A pulsed electric current of known amplitude and time-occurrence is passed through a transmitter coil creating a primary EM field in the space surrounding the coil, including underground. The eddy currents generated in the ground in turn induce a time-varying secondary magnetic field that is sensed by the receiving coil. In the off-time of the transmitter, the signal magnitude and time-variation of the signal magnitude is proportional to the terrain conductivity. In the on-time of the transmitter, the received signal is proportional to the terrain conductivity and to the transmitted primary signal. The depth of penetration of the EM field into the subsurface is governed by the terrain conductivity, transmitter power, transmitter excitation frequency and coil orientation.

The depth of penetration of an EM field depends upon its frequency and the electrical conductivity of the medium through which the EM field is propagating. EM fields are attenuated, or weakened, during their passage through the subsurface. The amplitude of the EM field decreases exponentially with depth. The depth of penetration increases as both the frequency of the electromagnetic field and the conductivity of the ground decrease (for example, according to the formula $d(m)=503/\sqrt{conductivity \times frequency}$). Consequently, the frequency used in an EM survey can be tuned to a desired depth range in any particular medium.

Accordingly, EM survey systems have traditionally been designed with transmitters to transmit energy in a wide range of frequencies, or be as broadband, as possible. Similarly, receivers employed in EM survey systems are designed to measure the EM response for a wide frequency range typically sacrificing low-frequency sensitivity for high-frequency response. The high-frequency end of the EM spectrum, or range of frequencies, is used to detect subsurface bodies with large electrical resistivity values (and provide near-surface vertical resolution). The low-frequency end of the EM spectrum is used to detect subsurface bodies with low electrical resistivity values (and provide deeper subsurface exploration).

It is impossible, however, with a single system to measure all frequencies of the spectrum well. To generate energy at high frequencies, it is necessary in the time domain to employ a transmitter with a very fast current turn off, which necessitates a low transmitter loop inductance that can be obtained by decreasing the area and number of turns of the wire loop, which also results in a suppressed transmitter dipole moment. The small moment also serves to reduce high-frequency noise by decreasing transients caused by induction of eddy currents within the conductive survey system components and in the aircraft. To further reduce noise in these system transients, other strategies include rigidly connecting the transmitter and receiver, or locating the receiver such that it is minimum-coupled to the transmitter. To perform accurate measurement of high-frequency responses, it is necessary to measure EM responses of very short time duration, which requires a receiver coil with a short self-response which requires a small receiver coil turns-area. These design requirements are in contrast to those for transmitting and measuring low-frequency responses.

To generate low-frequency energy, it is desirable to maximize the transmitter dipole moment by increasing the transmitter turns-area and current passed through the wire loop. However, these design parameters increase the transmitter loop inductance and increase the time for current turn-off (and increasing system transient noise), and are therefore detrimental for transmitting and measuring high-frequency signals. Resonance considerations show that a half-sine waveform is the most efficient choice of waveform for converting electric potential energy into transmitted current. However, this results in a slow current turn-off, which is detrimental to generating high-frequency signals. To measure low-frequency signals, it is desirable to increase the voltage generated in the receiver coil by having a large receiver coil turns-area. However, this increases the coil self-response and therefore decreases ability to measure high-frequency signals. Further, to measure low-frequency signals it is necessary to decrease the effect of receiver motion in the earth's static magnetic field. It is generally desirable to employ soft suspension systems to reduce this effect to the detriment of the measurement of high-frequency signals. These design considerations show that it is impossible to design a single system which transmits and measures high and low-frequency energy well. Thus, a need has arisen for a system that is capable of operating in both low-frequency and high-frequency bandwidths to accurately survey subsurface properties at both shallower depths (for example, near-surface depths) and deeper depths and to detect targets of a wider conductivity range.

SUMMARY

In accordance with some embodiments of the present disclosure, a system for electromagnetic geophysical exploration is provided. The system includes a first transmitter configured to transmit a first waveform in a first spectrum and a first receiver configured to sense signals in the first spectrum. The system also includes a second transmitter configured to transmit a second waveform, and a second receiver configured to sense signals in the second spectrum and minimum-coupled to the second transmitter. The second spectrum has a frequency higher than a frequency of the first spectrum. The system further includes a control portion configured to control the first transmitter to transmit the first waveform in the first spectrum, and control the second transmitter to transmit the second waveform in the second spectrum after a specified time delay. The control portion is also configured to receive signals sensed by the first receiver in the first spectrum, and receive signals sensed by the second receiver in the second spectrum.

In accordance with another embodiment of the present disclosure, a method of electromagnetic geophysical exploration is provided that includes controlling a first transmitter to transmit a first waveform in a first spectrum. The method also includes controlling a second transmitter to transmit a second waveform in a second spectrum after a specified time delay. The second spectrum has a frequency higher than a frequency of the first spectrum. The method further includes receiving signals sensed by a first receiver in the first spectrum, and receiving signals sensed by a second receiver in the second spectrum. The second receiver configured to be minimum-coupled to the second transmitter.

In accordance with another embodiment of the present disclosure, a non-transitory computer-readable medium includes instructions that, when executed by a processor, cause the processor to control a first transmitter to transmit a first waveform in a first spectrum, and control a second transmitter to transmit a second waveform in a second spectrum after a specified time delay. The second spectrum has a frequency higher than a frequency of the first spectrum. The processor is also caused to receive signals sensed by a first receiver in the first spectrum, and receive signals sensed by a second receiver in the second spectrum. The second receiver configured to be minimum-coupled to the second transmitter.

BRIEF DESCRIPTION OF THE DRAWINGS

For a more complete understanding of the present disclosure and its features and advantages, reference is now made to the following description, taken in conjunction with the accompanying drawings, which may include drawings that are not to scale and wherein like reference numbers indicate like features, in which.

DETAILED DESCRIPTION

The following description of the exemplary embodiments refers to the accompanying drawings. The same reference numbers in different drawings identify the same or similar elements.

The limitations of the surveying or geophysical exploration systems and methods described above have led to the present disclosure of the systems and methods employing multiple broadband systems (combined in a way that they do not interfere) in an attempt to provide different frequency ranges, as well as providing some focusing of the electromagnetic (EM) spectrum at the particular frequency ranges, with one part of the system transmitting low-frequency energy and measuring low-frequency signals and another part of the system transmitting and measuring high-frequency signals. A consideration for this differentiation in multiple systems is the design trade-offs described above: the physical geometry and electronics required to optimize measurements at one end of the EM spectrum (for example, low frequency) degrades performance at the other end of the spectrum (for example, high frequency). Conceivably, low-frequency and high-frequency bandwidth systems could be designed to be flown independently, however, this approach leads to errors relating to inconsistencies in position, height and phase leading to suboptimal interpretation of the underlying geology and additional costs. Thus, the present disclosure employs both of these systems in a single geophysical survey platform.

As described above, an EM survey system that uses multiple broadband systems to detect both low frequencies and high frequencies in the EM spectrum is expensive and can cause degraded performance at either end of the EM spectrum. Therefore, according to embodiments of the present disclosure, systems and methods are presented that provide multiple bandwidth EM surveying. An EM survey system of the present disclosure is capable of measuring both the low-frequency and high-frequency portions of the EM spectrum with improved data quality, for example, the data may have a higher signal to noise ratio. Measurements may be made utilizing two or more distinct transmitter-receiver pairs. Each of the pairs may be optimized to a particular frequency band of interest, thereby providing an improved data set at all frequencies.

High-frequency EM data can be used to detect and characterize subsurface targets with high electrical resistivity, and/or to characterize near-surface layering—layers within, for example, approximately 165 feet or 50 meters of the earth's surface—while also discriminating thin layers within that depth. In some embodiments, to generate high-frequency EM energy a signal with a fast turn-off may be used in the transmitter. To achieve fast turn-off, the transmitter may be small with few turns, both of which limit dipole moment (such as, the strength of the transmitted signal) and exploration depth. EM energy emitted by a transmitter may also be referred to as an "EM signal" or "EM wave." In addition, on-time measurements during the transmitter on-time may be made to enhance high-frequency energy. For example, when the transmitter is transmitting a waveform, a receiver may be configured to sense return signals approximately simultaneously.

To detect electrically conductive targets or characterize the subsurface beyond the near surface, a low-frequency EM excitation may be used. In some embodiments, to generate low-frequency EM energy a transmitter may be operated with large dipole moment. As such, to characterize the subsurface at depths beyond the near-surface and maximize dipole moment, a transmitter with a large area (for example, physical area or numerous turns) may be used. In addition, many on-time measurements can be made during the ramp-up or ramp-off of the transmitter waveform to extend the overall bandwidth of the system.

In some embodiments, the transmitter transmitting the low-frequency energy may be constructed as a large-diameter loop, for example on the order of approximately 25 to 50 meters and may comprise one or more turns of wire, for example approximately one to ten turns, or any other suitable size or number of turns as appropriate for the implementation. The transmitter loop may be towed beneath a helicopter or other aircraft or be strung around a fixed wing aircraft or some other airborne vehicle. The helicopter, fixed-wing aircraft, or other airborne vehicle may be manned or unmanned. In some embodiments, the low-frequency transmitter may transmit a half-sine waveform with a low base frequency, for example, on the order of approximately three to thirty hertz (Hz) with amplitude between approximately 500 to 2,000 amperes and a useable transmitted bandwidth of approximately three to 10,000 Hz. In some embodiments, the low-frequency receiver may have a larger coil diameter and a greater number of turns providing greater sensitivity at low frequencies. For example, a low-frequency coil may include approximately 100 turns wound on an approximately one meter diameter former resulting in a turns-area product of approximately 79 square meters ($m^2$) with noise levels approaching approximately 0.01 nanovolts per square meter ($nV/m^2$) and a receiver bandwidth of approximately one to 10,000 Hz. The receiver may be placed concentrically to the transmitter or placed at some distance from the transmitter, for example, on the order of approximately ten to 200 meters; however, in some embodiments, the receiver-transmitter separation may be greater than approximately 200 meters. The receiver coils may be attached with some form of soft suspension system which serves to translate any high-frequency vibration or motion into a slow, low-frequency motion below approximately five Hz, or preferably below approximately one Hz.

In some embodiments, the transmitter transmitting the high-frequency energy will be constructed as a smaller diameter loop on the order of approximately one to ten meters and may comprise only a few turns of wire, for example, approximately one or two turns. In some embodiments, the high-frequency transmitter may transmit a square waveform or trapezoidal waveform with a steep off-ramp such that the waveform is a close approximation to a square waveform resulting in significant energy at high frequencies. The current amplitude of this waveform may be, for example, on order of approximately ten to 400 amperes allowing ramp times of approximately two to forty microseconds (µs) and a useable transmitted bandwidth of approximately 1,000 to 100,000 Hz. There is an implicit tradeoff between minimizing ramp time and maximizing peak current. The high-frequency receiver may be rigidly affixed in some way to the high-frequency transmitter such that the electromagnetic coupling is kept constant or as close to constant as possible, and the high-frequency receiver may be null-coupled to the transmitter, either by locating the receiver at a suitable geometric location or minimum-coupled by wrapping the high-frequency receiver around the high-frequency transmitter wires. There are many ways to achieve minimum-coupling which may be implemented. As a rigid connection may maintain a constant or near-constant coupling, the receiver may not employ a suspension system.

A high-frequency coil for a high-frequency receiver may include, for example, approximately ten turns wound on an approximately one meter diameter former resulting in a turns area product of 7.9 m² with noise levels approaching approximately one nV/m² and a useable bandwidth of approximately 1,000 to 300,000 Hz. Further, the high-frequency transmitter may be separated from nearby air vehicles in order to reduce noise from coupling between the system and the vehicle. In some embodiments, the transmitter-receiver pair may be towed below or below and behind a fixed-wing aircraft or balloon or other airborne vehicle, such that it is separated by some distance from the aircraft and the low-frequency transmitter. In an embodiment with a helicopter, the high-frequency transmitter and receiver may be placed concentric to the low-frequency transmitter and both may be towed below the helicopter. The low-frequency receiver may then be placed concentric to the high-frequency transmitter or at a location null-coupled to the low-frequency transmitter or at some other position along the mechanism towing the low-frequency transmitter.

Thus, the low-frequency portion of the system may comprise a large area transmitter with multiple turns and large transmitter current to maximize transmitter moment with low base frequency; and a half-sine waveform measured with a large turns-area receiver with a soft suspension at some distance from the transmitter and air vehicle. The high-frequency portion of the system may comprise a small area transmitter with only one or two turns and small transmitter current to minimize current turn-off time and system transients; and employ a trapezoid or square waveform which can have a higher base frequency. The high-frequency response may be measured using a small turns-area receiver with a rigidly connected receiver (for example, one that is minimum or null-coupled). Further, there may be significant overlap of bandwidth between the low and the high-frequency system capabilities for effective coverage.

According to some embodiments, an EM survey system consisting of at least two distinct transmitter and receiver sets is employed. Each transmitter-receiver set may be arranged to transmit and receive a different bandwidth of the EM spectrum. In some embodiments, the transmitter-receiver pairs may be arranged to measure a partially overlapping bandwidth of the EM spectrum. For example, one transmitter-receiver set may be optimized to transmit and receive EM signals of relatively high-frequency while another transmitter-receiver set may be optimized to transmit and receive relatively low-frequency signals. The bandwidth of each transmitter-receiver pair may be optimized such that there is some degree of frequency overlap so that when combined, the dataset is continuous. The overlap between the frequency bandwidth of each transmitter-receiver pair may aid in acquiring EM data covering the range of shallow to mid to deep subsurface formations. Thus, at least two distinct transmitter and receiver sets allow for optimization of each set to transmit and receive a desired frequency band of EM energy.

In some embodiments, a variety of methods may be employed to tailor the bandwidth of each transmitter-receiver set. For example, to optimize measurement of low-frequency information, the geometry of the transmitter wire may be designed to consist of a large area or a large number of turns or permit conduction of a large amount of current. Conversely, to optimize measurement of high-frequency energy, the transmitter wire may be designed to consist of fewer turns or less effective area.

The receiver measuring low-frequency information may be designed to consist of a large effective area or large number of turns or employ a magnetic core. Conversely, the receiver measuring high-frequency information may consist of smaller effective area or fewer turns. The geometric construction of the receiver measuring high-frequency information may also be optimized for measurement of high-frequency signals.

Thus, the low-frequency transmitter may have a predetermined geometry and a predetermined number of turns to operate in the particular low-frequency spectrum. Similarly, the high-frequency transmitter may have a predetermined geometry and a predetermined number of turns to operate in the particular high-frequency spectrum. Moreover, each of the low-frequency receiver and the high-frequency receiver may have a particular geometry that is optimized to make measurements for the particular respective frequency spectrums in which each of the low-frequency transmitter and high-frequency transmitter operate.

In addition, the receiver for the measurement of high-frequency signals may be disposed at an electromagnetic null location of the transmitter designed for high-frequency energy excitation. An electromagnetic null location may be a location at which the response of the receiver is nulled to the primary EM field of the transmitter. An electromagnetic null may be accomplished, for example, by minimizing coupling between the transmitter and receiver. For example, minimizing coupling between the transmitter and receiver may be achieved by disposing the receiver half-inside and half-outside the transmitter loop or by disposing the receiver at the appropriate angle away from the transmitter loop.

Figure 1:
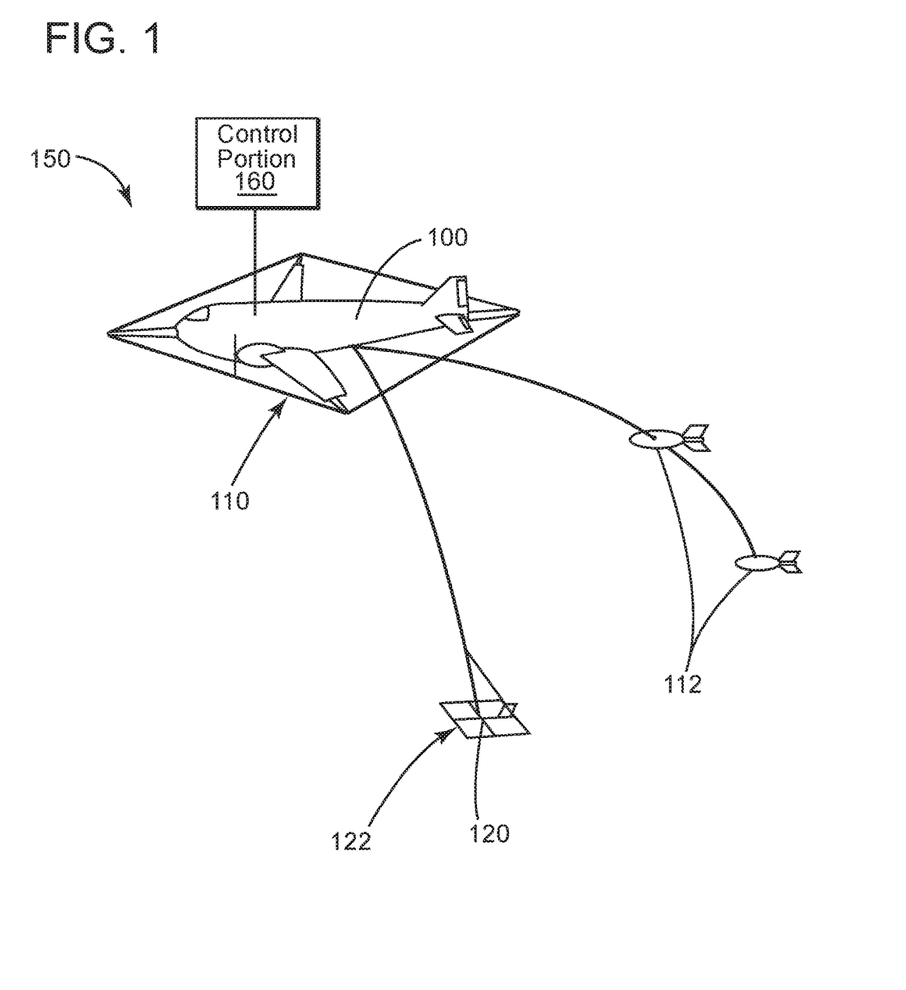
FIG. 1 illustrates a multiple bandwidth electromagnetic geophysical exploration system with an airplane in accordance with some embodiments of the present disclosure.

FIG. 1 illustrates a multiple bandwidth electromagnetic geophysical exploration system 150 with airplane 100 in accordance with some embodiments of the present disclosure. FIG. 1 depicts an exemplary physical embodiment of a multiple bandwidth EM geophysical exploration system 150, also referred to as "system" 150. In some embodiments, system 150 may include airplane 100 that tows two or more transmitters and receivers. Although illustrated with one airplane 100, multiple airplanes 100 may be utilized in system 150 or a multitude of receivers 112 with different bandwidths and/or effective areas may be utilized.

In some embodiments, one or multiple transmitter-receiver pairs may be designed to measure low-frequency signals. For example, low-frequency transmitter 110 is positioned around airplane 100 and consists of a large area. Low-frequency transmitter 110 may include a coil surrounding airplane 100 and secured to a plurality of different points on the body of airplane 100.

Low-frequency receiver 112 may be optimized for low-frequency energy. Low-frequency receiver 112 may be towed behind or below low-frequency transmitter 110. Low-frequency receiver 112 may be towed by the same airplane 100 that tows low-frequency transmitter 110. Alternatively, low-frequency receiver 112 may be towed by a different airplane. Low-frequency receiver 112 may be designed to measure low-frequency signals by increasing turns-area (for example, a larger area for turns of wire on the coil) and increasing electronic gain.

In some embodiments, a transmitter-receiver pair may be designed to measure high-frequency signals. For example, high-frequency transmitter 120 may be small in area, allowing a fast transmitter current turn-off. High-frequency receiver 122 may be null-coupled to high-frequency transmitter 120, which reduces transmitter transients and allows measurement at very early off-times. Similarly, high-frequency receiver 122 may be optimized to measure high-frequency signals.

As depicted in FIG. 1, high-frequency transmitter 120 may be smaller than low-frequency transmitter 110 and may be disposed below and a specified distance away from low-frequency transmitter 110. High-frequency receiver 122 may be arranged in a manner, as described above, to be null-coupled to high-frequency transmitter 120.

To increase the amount information acquired in the survey, a plurality of low-frequency receivers 112 may be utilized. For example, FIG. 1 depicts a second low-frequency receiver 112 towed from airplane 100. Further, although an embodiment is depicted and described with airplane 100, the systems and methods of the present disclosure could also be applied to land-based or marine-based systems.

The low-frequency transmitter-receiver pair, low-frequency transmitter 110 and low-frequency receiver(s) 112, may be designed for high-moment, low base frequency operation. The low-frequency transmitter-receiver pair may be configured to optimize performance at low frequencies by, for example, increasing coil gain electronically or by turns-area or by a magnetic core, and may include more suspension and a non-rigid connection to reduce resonant frequency of system motion.

In contrast, the high-frequency transmitter-receiver pair may have a rigid connection with no suspension system. In the high-frequency transmitter-receiver pair, measurement at early delay times (for example, times shortly after turn-off) is important for obtaining near-surface information and thus, the self-response time of the high-frequency receiver and the time length of the signal turn-off need to be short. The design and configuration of the high-frequency receiver may minimize its self-response time, for example, by having a small turns-area. Further, by having fewer turns the transmitter current may be turned off quickly, such that higher frequency energy is excited into the ground. Moreover, by null-coupling the high-frequency transmitter-receiver pair (for example, disposing the receiver in a "null" position with respect to the transmitter), the transmitter transients (for example, transient energy) may be minimized to reduce their effect on the measured data.

The signals sensed by low-frequency receivers 112 and the signals sensed by the high-frequency receiver 122 may be received, for example, at a processing or control portion 160, as depicted in FIG. 1. Such a processing or control portion 160 may be disposed onboard an aircraft (for example, airplane 100 or helicopter 200, discussed with reference to FIG. 2A) or other vehicle or machine used for surveying or towed by the aircraft. Alternatively, such a processing or control portion 160 may be disposed remotely.

Figure 2A:
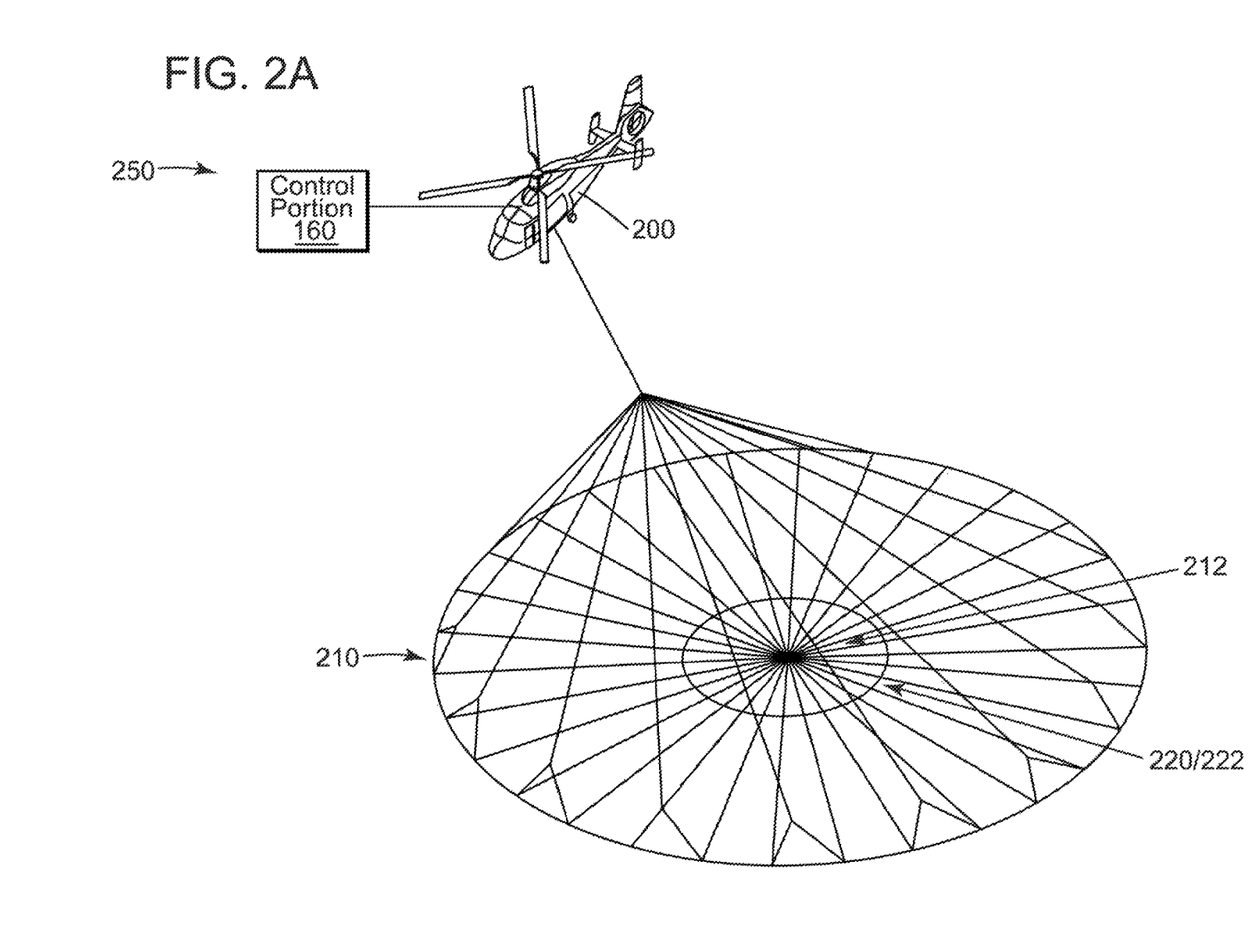
FIG. 2A illustrates a multiple bandwidth electromagnetic geophysical exploration system with a helicopter in accordance with some embodiments of the present disclosure.

FIG. 2A illustrates a multiple bandwidth electromagnetic geophysical exploration system 250 with a helicopter 200 in accordance with some embodiments of the present disclosure. As depicted in FIG. 2A, a low-frequency transmitter loop 210 may be disposed around a transmitter-receiver unit that may be towed by helicopter 200. Low-frequency transmitter 210 may be a substantially circular coil, forming a loop around the transmitter-receiver unit that may be suspended from helicopter 200. Alternatively, low-frequency transmitter 210 may be a square, diamond, rectangle, or other polygonal shape. A low-frequency receiver 212 is disposed substantially at the center of the loop formed by low-frequency transmitter 210. Another embodiment may be to place the low-frequency receiver at the apex of the set of cables supporting the low-frequency transmitter loop 210 or set of cables supporting high-frequency loops. Similar to the low-frequency transmitter-receiver pair described above for airplane 100 depicted in FIG. 1, low-frequency transmitter 210 and low-frequency receiver 212 are configured to be optimized to operate in a low-frequency bandwidth.

Figure 2B:
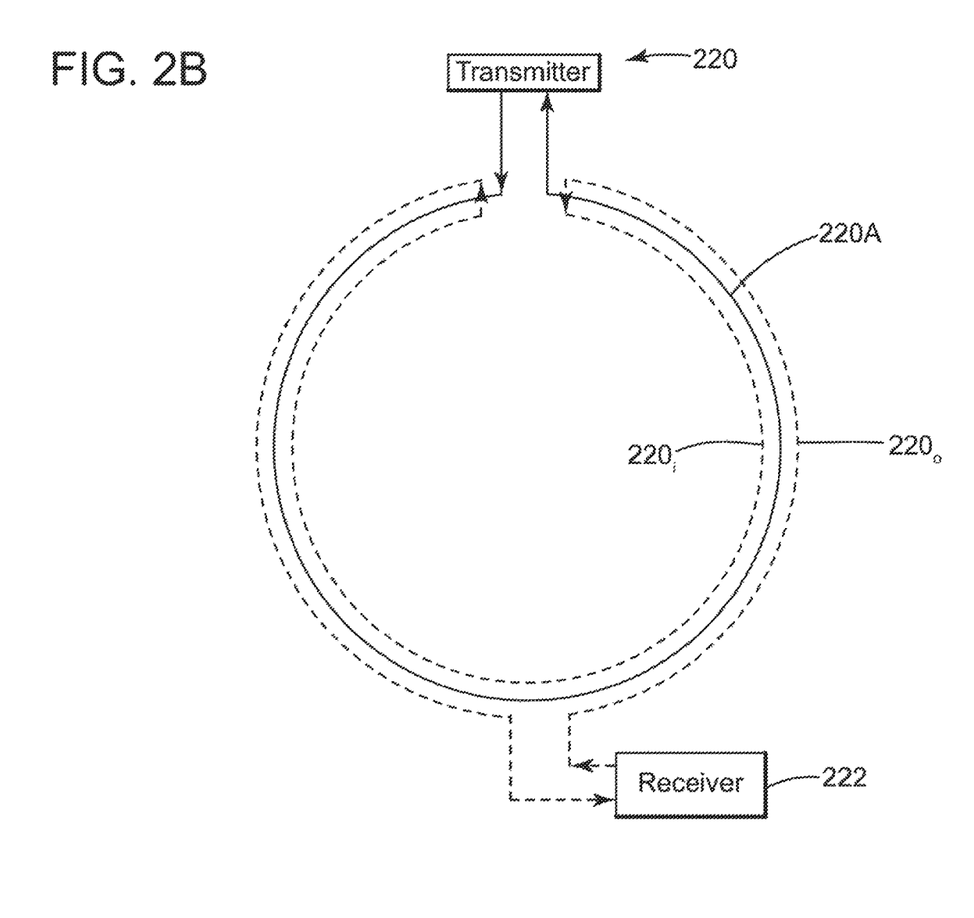
FIG. 2B illustrates a configuration of the high-frequency transmitter-receiver pair.

A high-frequency transmitter 220 and a high-frequency receiver 222 may be minimum-coupled. For example, as described above, high-frequency receiver may be arranged with respect to high-frequency transmitter 220 to be proximate to a "null" location. Further, high-frequency transmitter 220 and high-frequency receiver 222 may form a substantially circular coil and may be disposed to form a loop surrounding low-frequency receiver 212, but with a smaller diameter than low-frequency transmitter 210. For example, the null-coupled high-frequency transmitter-receiver pair 220/222 may be disposed such that a transmitter coil 220A for high-frequency transmitter 220 is disposed such that an inner receiver coil 222$i$ and an outer receiver coil 222$o$ for high-frequency receiver 222 surround the transmitter coil 220A for high-frequency transmitter 220, as shown in FIG. 2B. In other words, the transmitter coil 220A for high-frequency transmitter 220 may be disposed between an inner receiver coil 222$i$ and an outer receiver coil 222$o$ for high-frequency receiver 222, with each of the coils being substantially circular, as illustrated in FIG. 2B. In some embodiments, any of low-frequency transmitter 210, low-frequency receiver 212, high-frequency transmitter 220, and high-frequency receiver 222 may be polygonal, or any other suitable shape based on implementation.

In operation, each transmitter may generate an electromagnetic excitation. The excitation of each transmitter loop may occur simultaneously or allow for some specified time delay between excitations. Excitation of each transmitter may be performed at nearby locations such that high-frequency and low-frequency information is obtained for the same area. The bandwidth or frequency spectrum for the high-frequency transmitter-receiver pair includes frequencies greater than the low-frequency transmitter-receiver pair, but the bandwidths may overlap each other to allow for a continuous bandwidth from low-frequency to high-frequency to be implemented. Thus, for example, the high-frequency transmitter-receiver pair may be configured to sense earth properties from surface to approximately 100-200 meters depth, while the low-frequency transmitter-receiver pair may be configured to sense earth properties from approximately 50 meters beneath the surface to approximately 600-800 meters or greater beneath the surface.

Figure 3:
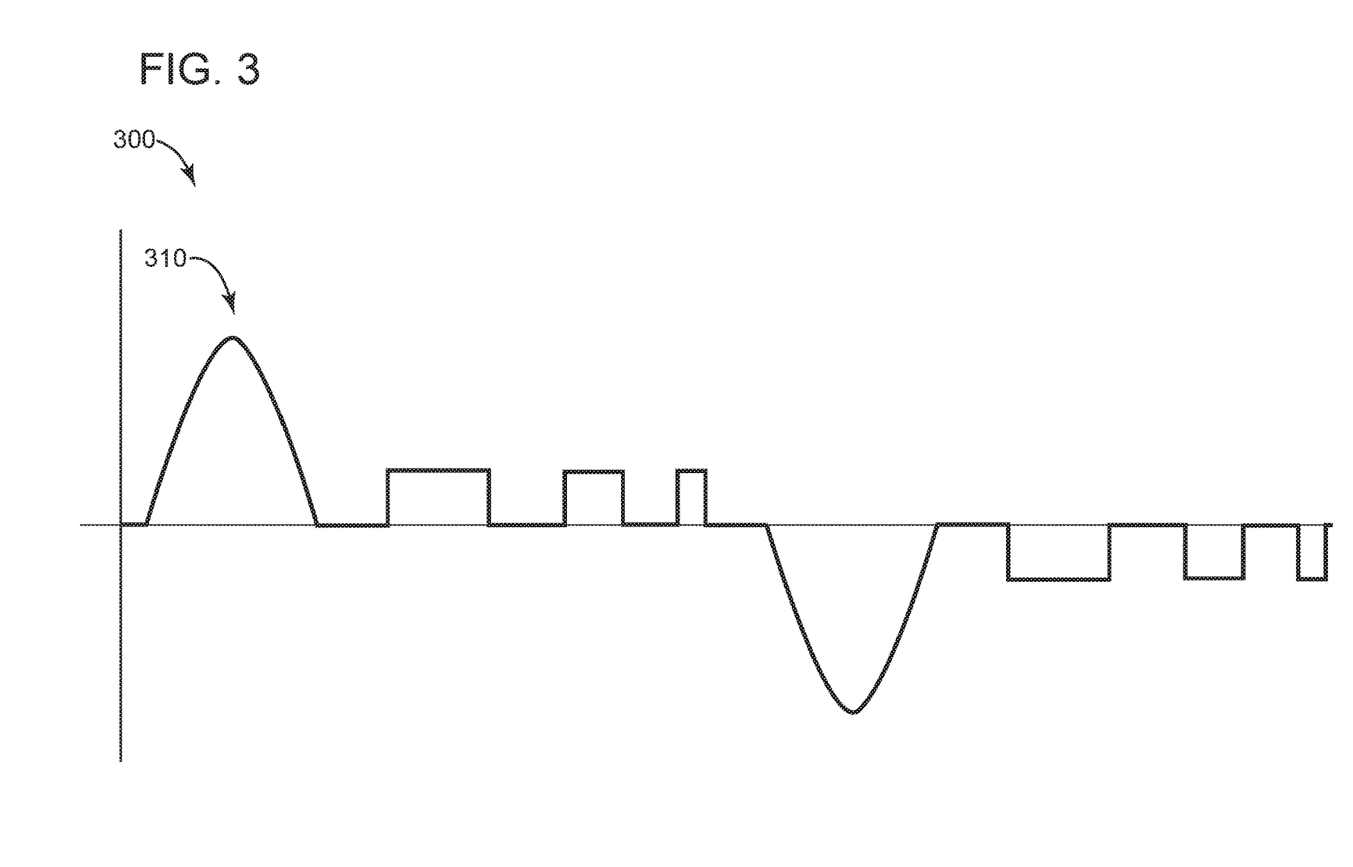
FIGS. 3 and 4 illustrate graphs of exemplary waveforms for survey cycles in accordance with some embodiments of the present disclosure.
Figure 4:
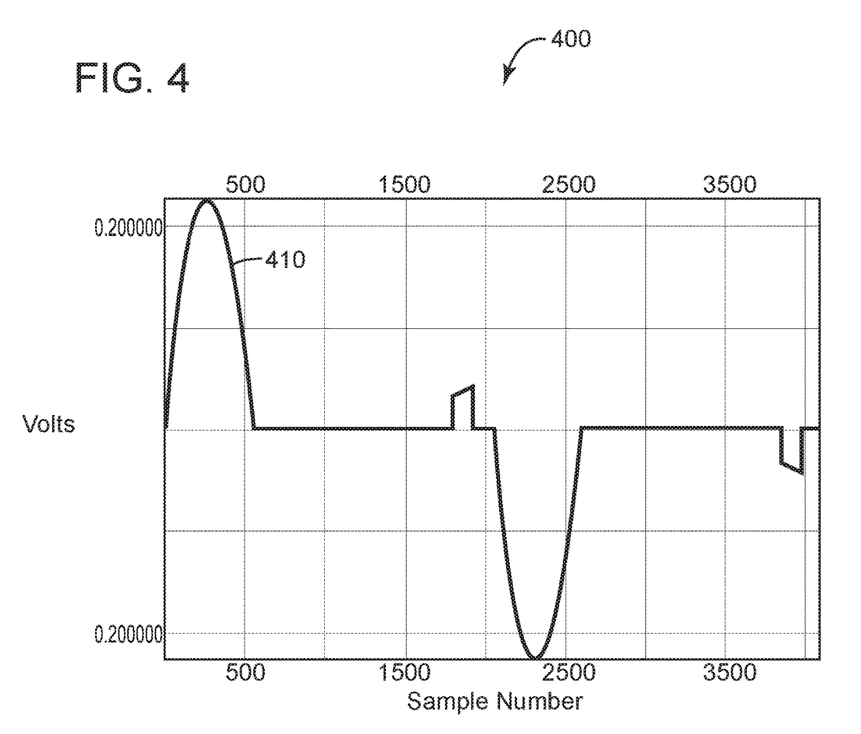

FIGS. 3 and 4 illustrate graphs 300 and 400 of exemplary current waveforms 310 and 410 for a transmitted cycle in accordance with some embodiments of the present disclosure. The excitation waveform for the two different transmitters 110 and 120 may be of different shape, amplitude or repetition frequency, or a combination thereof. For example, low-frequency transmitters 110 and 210, discussed with reference to FIGS. 1 and 2, respectively, may emit a waveform with half sine pulses. As another example, high-frequency transmitters 120 and 220 may emit a waveform with substantially square pulses or trapezoidal pulses. As depicted in FIG. 3, a single cycle may include, for example, positive half sine pulses and positive square pulses, separated by an off time and negative half sine pulses and negative square pulses. Equally valid would be a series of positive and negative half sine pulses followed by a series of positive and negative square or trapezoidal pulses. As depicted in FIG. 4, a single cycle may include, for example, positive half sine pulses and positive trapezoidal pulses, separated by an off time and negative half sine pulses and negative trapezoidal pulses.

Data from each survey may be used independently for processing, interpretation, modelling, or transforming from data to electrical properties or to geology. By using at least two transmitter-receiver pairs, a system with two separate, overlapping bandwidths may better measure a wider range of frequencies. In some embodiments, the two transmitter-receiver pairs may be based on a single transmitter enabled to emit both low-frequency and high-frequency signals that may be paired separately with two different receivers. Accordingly, more accurate and robust information regarding earth properties may be obtained by combining the data from the two transmitter-receiver pairs and performing simultaneous processing, modelling, or transforming the data to electrical properties or geology. Further, modelling or interpreting data from one of the transmitter-receiver pairs and subsequent modelling or interpretation of data from the other transmitter-receiver set based on the results from the first set may also improve the interpretation, model, or product. For example, the data from each of the low-frequency and high-frequency transmitter-receiver pairs may be cross-correlated for improved signal noise reduction. Additionally the overlapping bandwidths could be used to calibrate the overall system response.

Figure 5:
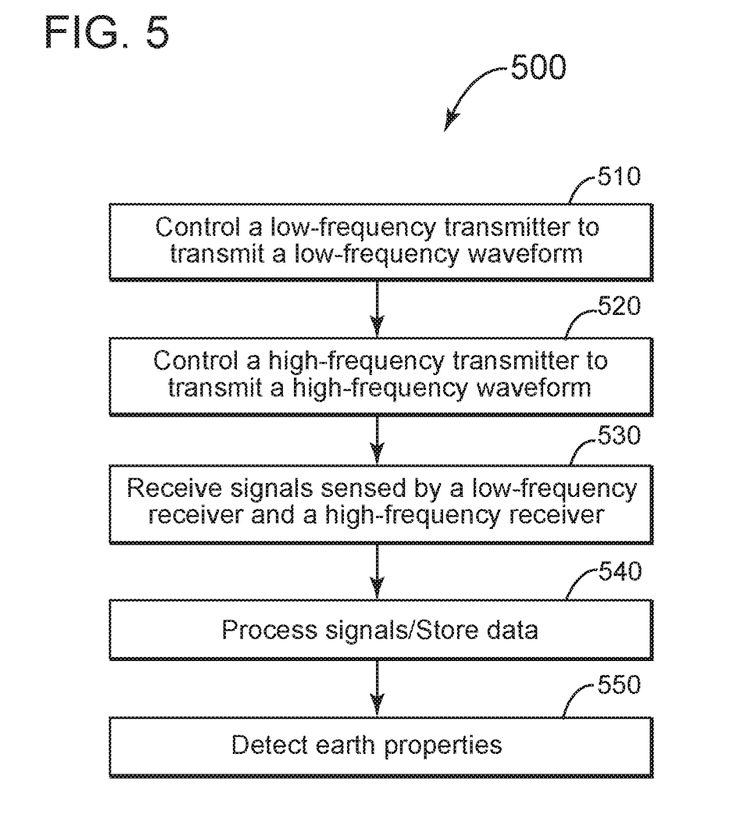
FIG. 5 illustrates a flow chart of an example method for multiple bandwidth electromagnetic geophysical exploration in accordance with some embodiments of the present disclosure.

FIG. 5 illustrates a flow chart of an example method 500 for multiple bandwidth electromagnetic geophysical exploration in accordance with some embodiments of the present disclosure. The steps of method 500 are performed by a user, various computer programs, models configured to process or analyze geophysical data, and combinations thereof. The programs and models include instructions stored on a computer readable medium and operable to perform, when executed, one or more of the steps described below. The computer readable media includes any system, apparatus or device configured to store and retrieve programs or instructions such as a hard disk drive, a compact disc, flash memory, or any other suitable device. The programs and models are configured to direct a processor or other suitable unit to retrieve and execute the instructions from the computer readable media. Collectively, the user or computer programs and models used to process and analyze geophysical data may be referred to as a "computing system." For illustrative purposes, method 500 is described with respect to data based on control portion 160 of FIGS. 1 and 2. A particular survey may include many cycles of transmitting and receiving electromagnetic signals and is not limited to any order of processes described herein.

At step 510, a control portion may control a low-frequency transmitter to transmit a low-frequency waveform in a lower frequency spectrum. At step 520, the control portion may control an high-frequency transmitter to transmit a waveform in a higher frequency spectrum after a specified time. The frequency spectrum emitted by the high-frequency transmitter may be higher than the frequency spectrum emitted by the low-frequency transmitter, or may overlap the frequency spectrum emitted by the low-frequency transmitter. In other words, at least a portion of the higher frequency spectrum is greater than the lower frequency spectrum. Further, in some embodiments, one transmitter may be utilized to transmit both the high-frequency and the low-frequency signals. At step 530, the control portion receives signals that are sensed by a low-frequency receiver and an high-frequency receiver. In some embodiments, the receivers may receive signals during the time that the transmitter is transmitting a waveform, for example, during the on-time of the transmitters. At step 540, the control portion may store and/or process the received signals. Alternatively, the raw data from the received signals may be stored for processing at a later time. At step 550, the control portion may analyze the received data and detect earth properties from surface to varying depths beneath the surface. In method 500, the steps may be performed in any appropriate order. For example, step 530 may be performed concurrently with steps 510 and 520. As another example, step 520 may occur before or concurrently with step 510.

As described above, the design requirements for efficient transmitting and measuring of low and high-frequency energy and signals requires tradeoffs and the present disclosure represents an advantageous method to perform both simultaneously. Embodiments of the present disclosure enable two independent time domain systems with different bandwidths, such that multiple transmitters and multiple receivers may be implemented in a single system to achieve optimized multiple bandwidth electromagnetic surveying in the single system. The waveform transmitted by the low-frequency transmitter and the waveform transmitted by the high-frequency transmitter may be synchronized in time to accurately measure in both the low-frequency spectrum and the high-frequency spectrum.

An advantage of the present disclosure is overcoming certain shortcomings of geophysical systems that are either broadband or optimized to one of deep or shallow exploration. The present disclosure effectively achieves two optimized systems; one for near-surface resolution and the other for deep exploration; in a single system. The present disclosure achieves a commercial advantage by capturing all relevant information about earth properties of prospective land without the need to conduct multiple surveys or the limitations of different systems optimized for different depths and targets. Another advantage of the present disclosure is that it provides increased sensitivity with respect to vertical resolution or spatial resolution and depth of exploration. An advantage of the distinct transmitter-receiver sets of the present disclosure may be realized because the electrical components for measurement of high and low-frequency energy may be different. A further advantage of the distinct transmitter-receiver sets of the present disclosure may be realized by the physical separation in space of the two transmitter-receiver pairs and by a separation in time of the excitation from each of the transmitters.

Figure 6:
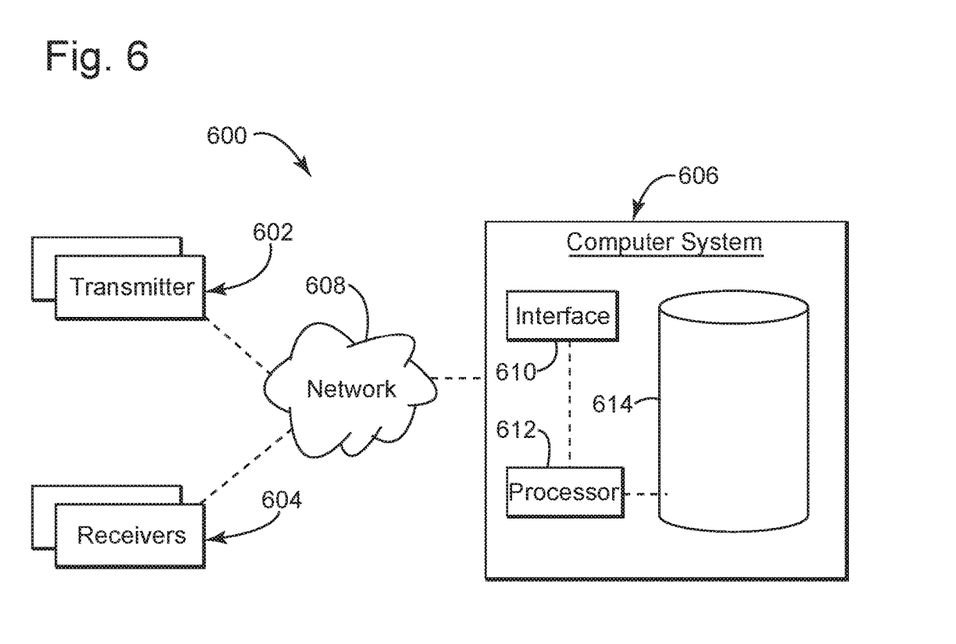
FIG. 6 illustrates a schematic diagram of an example system that can be used for multiple bandwidth electromagnetic geophysical exploration in accordance with some embodiments of the present disclosure.

FIG. 6 illustrates a schematic diagram of an example system 600 that can be used for multiple bandwidth electromagnetic geophysical exploration in accordance with some embodiments of the present disclosure. System 600 includes one or more transmitters 602, one or more receivers 604, and computing system 606, which are communicatively coupled via network 608. Computing system 606 may include some or all components of control portion 160 discussed with reference to FIGS. 1 and 2.

Computing system 606 can operate in conjunction with transmitters 602 and receivers 604 having any structure, configuration, or function. Transmitters 602 may include low-frequency transmitters and high-frequency transmitters, and receivers 604 may include low-frequency receivers and high-frequency receivers. Further, a positioning system, such as a global positioning system (GPS, GLONASS, etc.), may be utilized to locate or time-correlate transmitters 602 and receivers 604.

Computing system 606 may include any instrumentality or aggregation of instrumentalities operable to compute, classify, process, transmit, receive, store, display, record, or utilize any form of information, intelligence, or data. For example, computing system 606 may be one or more mainframe servers, desktop computers, laptops, cloud computing systems, storage devices, or any other suitable devices and may vary in size, shape, performance, functionality, and price. Computing system 606 may include random access memory (RAM), one or more processing resources such as a central processing unit (CPU) or hardware or software control logic, or other types of volatile or non-volatile memory. Additional components of computing system 606 may include one or more disk drives, one or more network ports for communicating with external devices, various input and output (I/O) devices, such as a keyboard, a mouse, and a video display. Computing system 606 may be configured to permit communication over any type of network 608. Network 608 can be a wireless network, a local area network (LAN), a wide area network (WAN) such as the Internet, or any other suitable type of network.

Network interface 610 represents any suitable device operable to receive information from network 608, transmit information through network 608, perform suitable processing of information, communicate with other devices, or any combination thereof. Network interface 610 may be any port or connection, real or virtual, including any suitable hardware and/or software (including protocol conversion and data processing capabilities) that communicates through a LAN, WAN, or other communication system. This communication allows computing system 606 to exchange information with network 608, other computing systems 606, transmitters 602, receivers 604, or other components of system 600. Computing system 606 may have any suitable number, type, and/or configuration of network interface 610.

Processor 612 communicatively couples to network interface 610 and memory 614 and controls the operation and administration of computing system 606 by processing information received from network interface 610 and memory 614. Processor 612 includes any hardware and/or software that operates to control and process information. In some embodiments, processor 612 may be a programmable logic device, a microcontroller, a microprocessor, any suitable processing device, or any suitable combination of the preceding. Computing system 606 may have any suitable number, type, and/or configuration of processor 612. Processor 612 may execute one or more sets of instructions to implement multiple bandwidth electromagnetic surveying, including the steps described above with respect to FIG. 5. Processor 612 may also execute any other suitable programs to facilitate the generation of broadband composite images such as, for example, user interface software to present one or more GUIs to a user.

Memory 614 stores, either permanently or temporarily, data, operational software, or other information for processor 612, other components of computing system 606, or other components of system 600. Memory 614 includes any one or a combination of volatile or nonvolatile local or remote devices suitable for storing information. For example, memory 614 may include random access memory (RAM), read only memory (ROM), flash memory, magnetic storage devices, optical storage devices, network storage devices, cloud storage devices, solid-state devices, external storage devices, any other suitable information storage device, or a combination of these devices. Memory 614 may store information in one or more databases, file systems, tree structures, any other suitable storage system, or any combination thereof. Furthermore, different types of information stored in memory 614 may use any of these storage systems. Moreover, any information stored in memory may be encrypted or unencrypted, compressed or uncompressed, and static or editable. Computing system 606 may have any suitable number, type, and/or configuration of memory 614. Memory 614 may include any suitable information for use in the operation of computing system 606. For example, memory 614 may store computer-executable instructions operable to perform the steps discussed above with respect to FIG. 5 when executed by processor 612. Memory 614 may also store any seismic data or related data such as, for example, raw seismic data, reconstructed signals, velocity models, seismic images, or any other suitable information.

The foregoing detailed description does not limit the disclosure. Instead, the scope of the disclosure is defined by the appended claims. The described embodiments are not limited to the disclosed configurations, and may be extended to other arrangements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but must be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. For example, the transmitting waveform, receiving sensed signals, and processing of received signals processes may be performed through execution of computer program code in a computer-readable medium.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

What is claimed is:

1. An electromagnetic geophysical exploration system comprising:
    a first transmitter configured to transmit a first waveform in a first spectrum;
    a first receiver configured to sense signals in the first spectrum;
    a second transmitter configured to transmit a second waveform in a second spectrum, the second spectrum having a frequency higher than a frequency of the first spectrum;
    a second receiver configured to sense signals in the second spectrum, the second receiver configured to be minimum-coupled to the second transmitter, wherein a transmitter coil of the second transmitter is disposed between an inner receiver coil and an outer receiver coil of the second receiver, and the inner receiver coil and the outer receiver coil of the second receiver surround the transmitter coil of the second transmitter; and
    a control portion configured to:
        control the first transmitter to transmit the first waveform in the first spectrum;
        control the second transmitter to transmit the second waveform in the second spectrum after a specified time delay;
        receive signals sensed by the first receiver in the first spectrum; and
        receive signals sensed by the second receiver in the second spectrum,
    wherein the electromagnetic geophysical exploration system is configured to be airborne.

2. The system of claim 1, wherein the control portion is further configured to store the received signals.

3. The system of claim 2, wherein the control portion is further configured to process the stored signals to analyze a subsurface formation.

4. The system of claim 1, wherein the first waveform includes a different waveform shape from the second waveform.

5. The system of claim 1, wherein the first spectrum and the second spectrum include an overlapping bandwidth portion.

6. The system of claim 1, wherein the second transmitter is configured to minimize a turn-off time for the second waveform.

7. The system of claim 1, wherein the first transmitter is a low-frequency transmitter and the first receiver is a low-frequency receiver.

8. The system of claim 1, wherein the second transmitter is a high-frequency transmitter and the second receiver is a high-frequency receiver.

9. The system of claim 1, wherein the signals sensed by the first receiver in the first spectrum are sensed during transmission of the first waveform by the first transmitter.

10. A method of electromagnetic geophysical exploration, comprising:
    controlling a first transmitter to transmit a first waveform in a first spectrum;
    controlling a second transmitter to transmit a second waveform in a second spectrum after a specified time delay, the second spectrum having a frequency higher than a frequency of the first spectrum;
    receiving signals sensed by a first receiver in the first spectrum; and
    receiving signals sensed by a second receiver in the second spectrum, the second receiver configured to be minimum-coupled to the second transmitter,
    wherein a transmitter coil of the second transmitter is disposed between an inner receiver coil and an outer receiver coil of the second receiver, and the inner receiver coil and the outer receiver coil of the second receiver surround the transmitter coil of the second transmitter, and
    wherein the first transmitter, the second transmitter, the first receiver and the second receiver are airborne.

11. The method of claim 10, further comprising storing the received signals.

12. The method of claim 11, further comprising processing the stored signals to analyze a subsurface formation.

13. The method of claim 10, wherein the first waveform includes a different waveform shape from the second waveform.

14. The method of claim 10, wherein the first spectrum and the second spectrum include an overlapping bandwidth portion.

15. The method of claim 10, wherein the second transmitter is configured to minimize a turn-off time for the second waveform.

16. A non-transitory computer-readable medium storing instructions that, when executed by a processor, cause the processor to:
    control a first transmitter to transmit a first waveform in a first spectrum;
    control a second transmitter to transmit a second waveform in a second spectrum after a specified time delay, the second spectrum having a frequency higher than a frequency of the first spectrum;
    receive signals sensed by a first receiver in the first spectrum; and
    receive signals sensed by a second receiver in the second spectrum, the second receiver configured to be minimum-coupled to the second transmitter,
    wherein a transmitter coil of the second transmitter is disposed between an inner receiver coil and an outer receiver coil of the second receiver, and the inner receiver coil and the outer receiver coil of the second receiver surround the transmitter coil of the second transmitter, and
    wherein the first transmitter, the second transmitter, the first receiver and the second receiver are configured to be airborne.

17. The medium of claim 16, wherein the processor is further caused to store the received signals.

18. The medium of claim 17, wherein the processor is further caused to process the stored signals to analyze a subsurface formation.

19. The medium of claim 16, wherein the first waveform includes a different waveform shape from the second waveform.

20. The medium of claim 16, wherein the first spectrum and the second spectrum include an overlapping bandwidth portion.

* * * * *